(12) United States Patent
Meehan

(10) Patent No.: US 10,830,491 B2
(45) Date of Patent: Nov. 10, 2020

(54) NOISE SUPPRESSION SYSTEM FOR AIR CONDITIONING COMPRESSOR

(71) Applicant: FORD GLOBAL TECHNOLOGIES, LLC, Dearborn, MI (US)

(72) Inventor: Trenton Scott Meehan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 15/887,499

(22) Filed: Feb. 2, 2018

(65) Prior Publication Data

US 2019/0242615 A1    Aug. 8, 2019

(51) Int. Cl.
*F24F 13/24*    (2006.01)

(52) U.S. Cl.
CPC .................... *F24F 13/24* (2013.01)

(58) Field of Classification Search
CPC ................................................ F24F 13/24
USPC ........................................................ 181/229
See application file for complete search history.

(56) References Cited

U.S. PATENT DOCUMENTS

| | | | |
|---|---|---|---|
| 4,384,635 A * | 5/1983 | Lowery | F04B 39/121 |
| | | | 181/202 |
| 5,899,670 A | 5/1999 | Ikeda et al. | |
| 6,524,080 B1 * | 2/2003 | Chintamani | F04B 39/0061 |
| | | | 181/212 |
| 7,278,834 B2 * | 10/2007 | Herrick | F04B 39/0044 |
| | | | 248/638 |
| 7,832,993 B2 | 11/2010 | Erfurt | |
| 7,922,460 B2 * | 4/2011 | Nagao | F04B 39/0061 |
| | | | 417/312 |
| 8,770,341 B2 * | 7/2014 | Wood | F04B 23/10 |
| | | | 181/229 |
| 9,145,879 B2 * | 9/2015 | Pirovano | F04B 39/0055 |
| 2004/0103683 A1 * | 6/2004 | Yoon | F04B 39/0061 |
| | | | 62/296 |
| 2007/0224052 A1 | 9/2007 | Eilenberger | |
| 2009/0175739 A1 | 7/2009 | Bhatia et al. | |
| 2011/0217185 A1 | 9/2011 | Wollitz | |

FOREIGN PATENT DOCUMENTS

DE    20122620 U1    9/2006
EP    1033492 A1    9/2000

OTHER PUBLICATIONS

English Machine Translation of DE20122620U1.

* cited by examiner

*Primary Examiner* — Forrest M Phillips
(74) *Attorney, Agent, or Firm* — David Coppiellie; King & Schickli, PLLC

(57) ABSTRACT

A noise suppression system for an air conditioning compressor includes an AC line, an AC line fitting and a muffler. At least a portion of the muffler is integrally formed with the AC line fitting.

16 Claims, 4 Drawing Sheets

NOISE SUPPRESSION SYSTEM FOR AIR CONDITIONING COMPRESSOR

TECHNICAL FIELD

This document relates generally to the motor vehicle equipment field and, more particularly, to a new and improved noise suppression system for an air conditioning compressor.

BACKGROUND

It is known in the art to mitigate noise vibration and harshness (NVH) from an air conditioning (AC) compressor noise source by adding a muffler in the AC refrigerant line. Such mufflers reduce the transmission of pulsations generated by the compressor. Typically, mufflers are added in the middle of the AC coolant line aluminum tube close to the AC compressor for maximum effectiveness but with a minimum of standoff distance from the compressor fitting for AC line manufacturing reasons. Significantly, the weight of the muffler and the standoff distance combine to cause sensitivity to vibration and durability failures may result.

When durability failures occur during testing, the muffler is often retained by additional brackets or other content is added so that the AC line is capable of surviving the vibration environment. Thus, adding a muffler increases the part count from two (fitting and AC line) to four (fitting plus AC line plus muffler plus a second tube on the other side of the muffler) and a bracket increases the part count two more (bracket plus isolator).

This document relates to a new and improved noise suppression system for an AC compressor wherein the muffler structure and compressor fitting are integrated together. Advantageously the new and improved noise suppression system is robust against vibration since it is directly supported by the fitting bolt mount and the standoff distance for the muffler structure is eliminated. The durability of the AC line is also enhanced as the integrated muffler and fitting provide additional support and the overall tube length is reduced. Advantageously, integrating the muffler and fitting together reduces the part count to two (integrated muffler fitting plus AC line) and the need to add any extra bracket for support is eliminated. Thus, the new noise suppression system represents a significant advance in the art.

SUMMARY

In accordance with the purposes and benefits described herein, a new and improved noise suppression system is provided for an AC compressor. That noise suppression system comprises an AC line, an AC line fitting and a muffler wherein at least a portion of the muffler is integrally formed with the AC line fitting.

The muffler may include a first portion integrally formed with the AC line fitting and a second portion integrally formed with the AC line. The AC line fitting may include a first body including the first portion of the muffler and a mounting lug. A fastener receiver may be provided in the mounting lug. Further, the noise suppression system may include a fastener passing through the fastener receiver and securing the AC line fitting to the AC compressor.

Still further, the noise suppression system may further include a first refrigerant port in the first portion of the muffler. The first refrigerant port may extend through the mounting lug. Further, the first refrigerant port and the fastener receiver may extend in parallel through the mounting lug.

Still further, the AC line of the noise suppression system may include a second body including a tube and the second portion of the muffler. That second portion may include a second refrigerant port in communication with a lumen in the tube.

The first portion and the second portion of the muffler are joined together and form a muffler chamber. In some of the many possible embodiments of the noise suppression system, the first refrigerant port opens laterally with respect to the muffler. In other embodiments of the many possible embodiments of the noise suppression system, the first refrigerant port opens axially with respect to the muffler.

In the following description, there are shown and described several preferred embodiments of the noise suppression system. As it should be realized, the noise suppression system is capable of other, different embodiments and its several details are capable of modification in various, obvious aspects all without departing from the noise suppression system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the noise suppression system and together with the description serve to explain certain principles thereof.

Reference will now be made in detail to the present preferred embodiments of the noise suppression system, examples of which are illustrated in the accompanying drawing figures.

DETAILED DESCRIPTION

Figure 1:
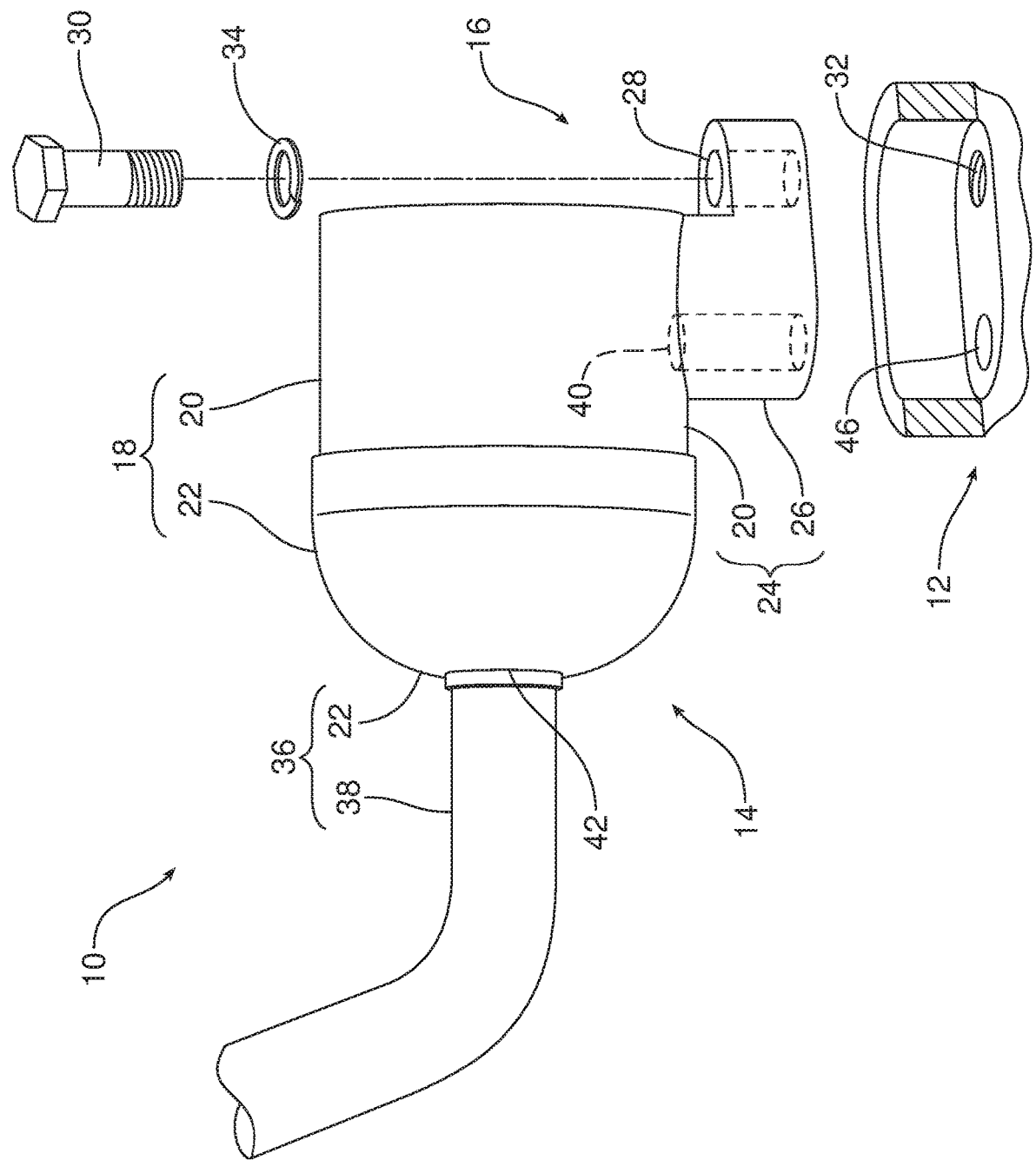
FIG. 1 is a partially exploded perspective view of the noise suppression system including the AC line, the AC line fitting and the muffler integrally formed with the AC line and the AC line fitting.
Figure 2A:
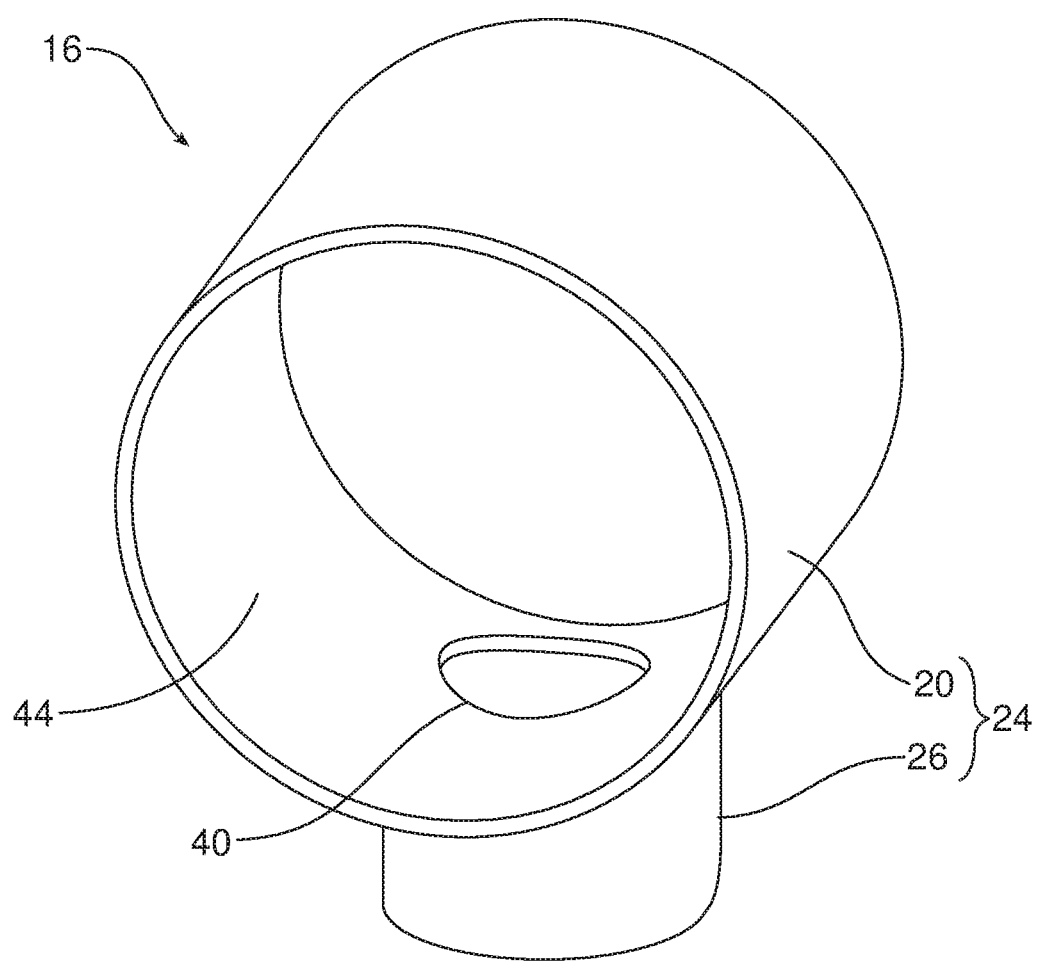
FIG. 2a is a detailed perspective view of the AC line fitting including a first body comprising a first portion of the muffler and a mounting lug.
Figure 2B:
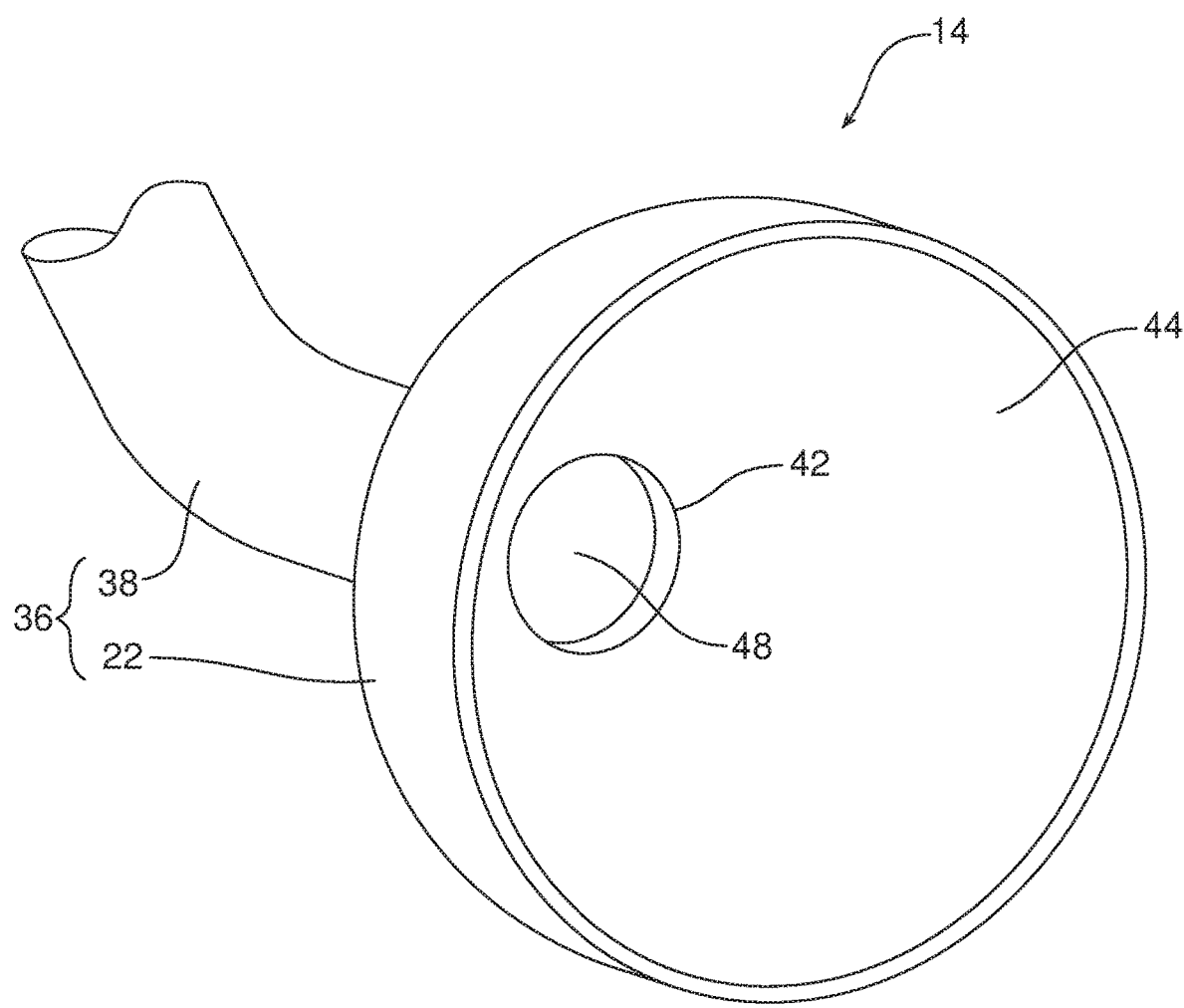
FIG. 2b is a detailed perspective view of the AC line including a second body comprising a tube and a second portion of the muffler.

Reference is now made to FIGS. 1, 2a and 2b illustrating a first possible embodiment of the new and improved noise suppression system 10 for an air conditioning (AC) compressor 12. That noise suppression system 10 includes an AC line 14, an AC line fitting 16 and a muffler 18. At least a portion of the muffler 18 is integrally formed with the AC line fitting 16.

More specifically, in the embodiment illustrated in FIGS. 1, 2a and 2b, the muffler 18 includes a first portion 20 integrally formed with the AC line fitting 16 and a second portion 22 integrally formed with the AC line 14.

More specifically, the AC line fitting 16 includes an integral first body 24 including the first portion 20 of the muffler 18 and a mounting lug 26. A fastener receiver 28 is provided in the mounting lug 26. A fastener 30, illustrated as a bolt in FIG. 1, passes through the fastener receiver 28 and secures the AC line fitting 16 to the threaded line fitting receiver 32 on the AC compressor 12. A cooperating lock nut 34 ensures that the bolt remains in a tightened condition during compressor operation.

The AC line 14 includes an integral second body 36 comprising the second portion 22 of the muffler 18 and the coolant tube 38.

By integrally forming the first portion 20 of the muffler 18 on the AC line fitting 16 and the second portion 22 of the muffler on the AC line 14, it is possible to manufacture the noise suppression system 10 utilizing aluminum casting with basic machining operations. The noise suppression system 10 may then be assembled by joining the first portion 20 of the muffler 18 with the second portion 22 of the muffler utilizing various techniques such as brazing/welding/vibration welding.

As should be appreciated from viewing FIGS. 1 and 2a, a first refrigerant port 40 is provided in the first portion 20 of the muffler 18. That first refrigerant port 40 extends through the mounting lug 26. More specifically, in the illustrated embodiment, the first refrigerant port 40 and the fastener receiver 28 extend in parallel through the mounting lug 26.

Figure 3:
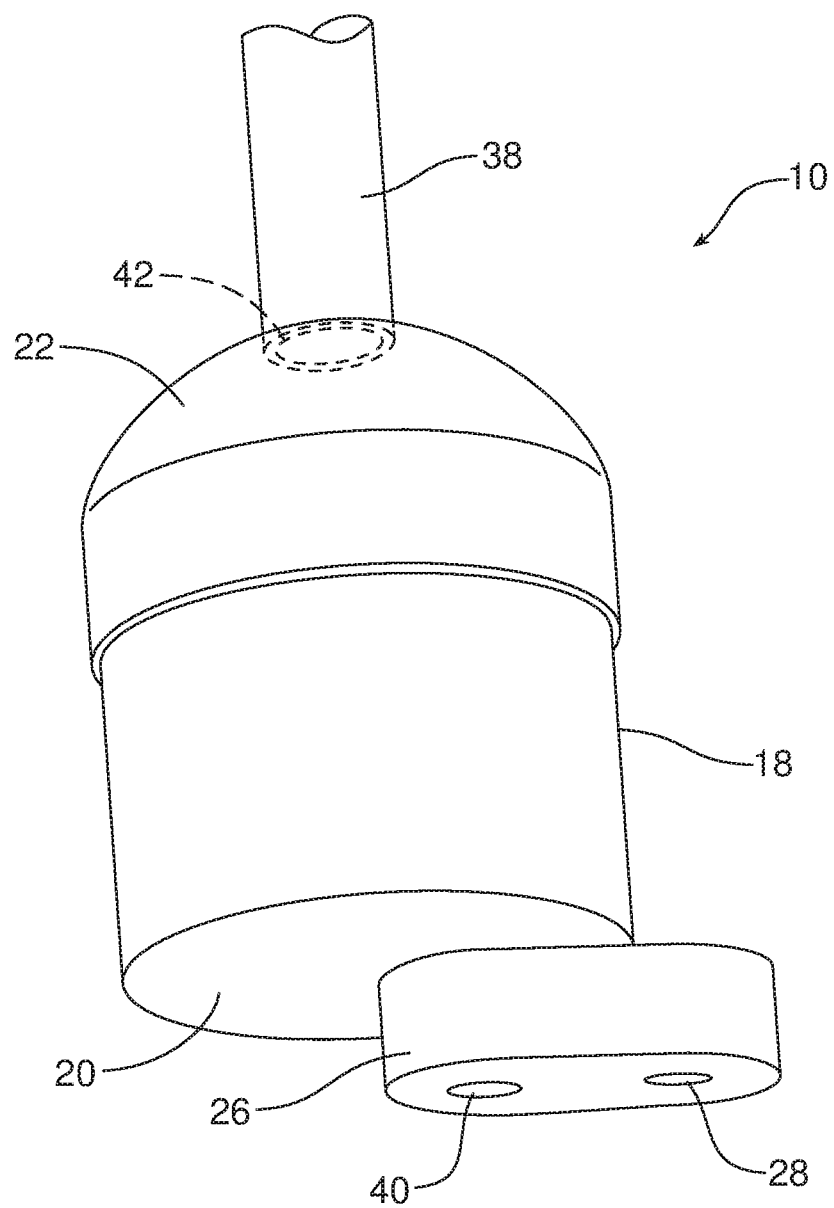
FIG. 3 is a perspective view of an alternative embodiment of the noise suppression system wherein the coolant port in the first portion of the muffler is in the end wall.

A second refrigerant port 42 is provided in the second portion 22 of the muffler 18. The second refrigerant port 42 opens axially with respect to the muffler 18 in the embodiment illustrated in FIGS. 1, 2a and 2b. In the embodiment illustrated in FIG. 3, the first refrigerant port 40 extends through the end wall 50 of the first portion 20 opposite to but offset from the second refrigerant port 42. Here it should be appreciated that the muffler 18, the first refrigerant port 40 and the second refrigerant port 42 may be oriented various ways according to packaging constraints and the AC line routing leads for a particular application. Thus, for example, the first refrigerant port 40 may extend from the axial end wall of the muffler 18 with or without rotation and tilt or from the side wall of the muffler 18 with or without rotation and tilt.

When the noise suppression system 10 is utilized on the suction side of the AC compressor 12, coolant travels from the lumen of the tube 38 through the second refrigerant port 42 into the muffler chamber 44 within the muffler 18 and then through the first refrigerant port 40 into the inlet 46 of the AC compressor 12. In contrast, when the noise suppression system 10 is utilized on the discharge side of the AC compressor 12, coolant flows from the outlet 46 of the AC compressor through the first refrigerant port 40 into the muffler chamber 44 and then through the second refrigerant port 42 into the lumen 48 of the tube 38.

The new and improved noise suppression system 10 described herein provides a number of significant benefits and advantages over prior art muffler systems that are located in the AC line spaced from the AC line fitting. The integrated design of the muffler 18 and AC line fitting 16 is robust against vibration as the muffler is directly supported by the fastener 30 that secures the AC line fitting to the AC compressor 12 and the standoff distance for the muffler structure is eliminated. Advantageously, this enhances the durability of the tube 38.

By integrally forming a first portion 20 of the muffler 18 with the mounting lug 26 and a second portion 22 of the muffler with the tube 38, it is possible to simplify and substantially reduce the cost of manufacturing the noise suppression system. Further, it should be appreciated that the noise suppression system is particularly versatile and the second refrigerant port 42 of the muffler 18 may be oriented at the axial end (see FIGS. 1 and 2b) or anywhere along the sidewall (see FIG. 3) of the muffler to accommodate virtually any foreseeable packaging constraints and AC line routing needs.

The foregoing has been presented for purposes of illustration and description. It is not intended to be exhaustive or to limit the embodiments to the precise form disclosed. Obvious modifications and variations are possible in light of the above teachings. For example, the entire muffler 18 could be integrally formed as a part of the AC line fitting 16 with the mounting lug 26. All such modifications and variations are within the scope of the appended claims when interpreted in accordance with the breadth to which they are fairly, legally and equitably entitled.

What is claimed:

1. A noise suppression system for an air conditioning (AC) compressor, comprising:
   an AC line;
   an AC line fitting; and
   a muffler having a first portion integrally formed with said AC line fitting and a second portion integrally formed with said AC line wherein the first portion and the second portion are joined and form a muffler chamber.

2. The noise suppression system of claim 1, wherein said AC line fitting includes a first body including said first portion of said muffler and a mounting lug.

3. The noise suppression system of claim 2, further including a fastener receiver in said mounting lug.

4. The noise suppression system of claim 3, further including a fastener passing through said fastener receiver and securing said AC line fitting to said AC compressor.

5. The noise suppression system of claim 4, further including a first refrigerant port in said first portion of said muffler.

6. The noise suppression system of claim 5, wherein said first refrigerant port extends through said mounting lug.

7. The noise suppression system of claim 6, wherein said first refrigerant port and said fastener receiver extend in parallel through said mounting lug.

8. The noise suppression system of claim 7, wherein said AC line includes a second body including a tube and said second portion of said muffler.

9. The noise suppression system of claim 8, wherein said second portion includes a second refrigerant port in communication with a lumen in said tube.

10. The noise suppression system of claim 9, wherein said first portion and said second portion are joined and form a muffler chamber.

11. The noise suppression system of claim 10, wherein said first refrigerant port opens laterally with respect to said muffler.

12. The noise suppression system of claim 10, wherein said first refrigerant port opens axially with respect to said muffler.

13. The noise suppression system of claim 2, wherein said AC line includes a second body including a tube and said second portion of said muffler.

14. The noise suppression system of claim 13, wherein said second portion includes a second refrigerant port in communication with a lumen in said tube.

15. The noise suppression system of claim 14, wherein said first refrigerant port opens laterally with respect to said muffler.

16. The noise suppression system of claim 14, wherein said first refrigerant port opens axially with respect to said muffler.

\* \* \* \* \*